(12) United States Patent
Kanarek

(10) Patent No.: US 11,770,012 B1
(45) Date of Patent: Sep. 26, 2023

(54) DEVICE, SYSTEM, AND METHOD OF CHARGING A BATTERY FOR AUDIOVISUAL EQUIPMENT

(71) Applicant: Ross Kanarek, Plainview, NY (US)

(72) Inventor: Ross Kanarek, Plainview, NY (US)

(*) Notice: Subject to any disclaimer, the term of this patent is extended or adjusted under 35 U.S.C. 154(b) by 0 days.

(21) Appl. No.: 17/970,283

(22) Filed: Oct. 20, 2022

(51) Int. Cl.
*H02J 7/00* (2006.01)

(52) U.S. Cl.
CPC ............ *H02J 7/0024* (2013.01); *H02J 7/007* (2013.01); *H02J 7/00032* (2020.01); *H02J 7/0045* (2013.01)

(58) Field of Classification Search
CPC ........ H02J 7/0024; H02J 7/0045; H02J 7/007; H02J 7/00032
USPC ................................. 320/107, 117, 134, 162
See application file for complete search history.

(56) References Cited

U.S. PATENT DOCUMENTS

| | | | | |
|---|---|---|---|---|
| 4,315,162 | A * | 2/1982 | Ferguson | H02J 9/061 307/66 |
| 7,642,749 | B2 * | 1/2010 | Nishida | H02J 7/0024 320/112 |
| 7,880,431 | B2 | 2/2011 | Rayl | |
| 9,781,496 | B2 | 10/2017 | Conrad | |
| 2005/0225959 | A1 | 10/2005 | Pohlert | |
| 2008/0180549 | A1 | 7/2008 | Lee | |
| 2010/0254696 | A1 | 10/2010 | McKay | |
| 2012/0306450 | A1 | 12/2012 | Nakayama | |
| 2013/0002175 | A1 | 1/2013 | Shimizu | |
| 2013/0057076 | A1 | 3/2013 | Lavender | |
| 2013/0320926 | A1 | 12/2013 | Kerfoot, Jr. | |
| 2014/0361740 | A1 | 12/2014 | Suzuki | |
| 2015/0035473 | A1 | 2/2015 | Zhou | |
| 2015/0061603 | A1 | 3/2015 | Loftus | |
| 2015/0318581 | A1 | 11/2015 | Johnson | |
| 2016/0006280 | A1 | 1/2016 | Ikeda | |
| 2016/0126758 | A1 | 5/2016 | Wu | |
| 2016/0254684 | A1 | 9/2016 | Gothoskar | |
| 2016/0299194 | A1 * | 10/2016 | Kanarek | H01M 10/4257 |
| 2016/0311094 | A1 | 10/2016 | Mergener | |
| 2017/0013369 | A1 | 1/2017 | Renken | |
| 2017/0077722 | A1 | 3/2017 | Jung | |
| 2018/0262152 | A1 * | 9/2018 | White | H02J 7/02 |
| 2020/0127339 | A1 * | 4/2020 | Nakano | H01M 10/0445 |

\* cited by examiner

*Primary Examiner* — Edward Tso
*Assistant Examiner* — Aaron Piggush
(74) *Attorney, Agent, or Firm* — SHORE IP GROUP, PLLC; Sean R. Wilsusen, Esq.

(57) ABSTRACT

A battery charging apparatus includes a battery charger having a housing and a battery mount plate for charging the battery. A contact block of the battery mount plate includes an electrical terminal configured to provide a charging voltage to the battery. The battery can operate in a first state in which the battery delivers a first delivery voltage or in a second state in which the battery delivers a second and higher delivery voltage. The battery can be charged in the first state or the second state. The battery charger switches the battery between the first state and the second state in which power is provided to the battery through the electrical terminal at the second and higher charging voltage to charge the battery.

20 Claims, 7 Drawing Sheets

DEVICE, SYSTEM, AND METHOD OF CHARGING A BATTERY FOR AUDIOVISUAL EQUIPMENT

FIELD

The present disclosure relates to a battery charger, more particularly, to a device, system, and method of charging a battery used for audiovisual equipment.

BACKGROUND

As audiovisual equipment becomes more power hungry, partly because of larger imaging sensors, as well as the advent of brighter output LED lighting, etc., two solutions to having ample power on cinematic productions are to bring more battery packs on set or be able to charge the battery packs faster. However, the rate at which batteries or battery packs can be charged is generally limited by the innate output voltage of the battery.

SUMMARY

While dual voltage battery packs, such as battery packs which can output a lower/standard mean voltage electrical power (e.g., about 14 volts) for the majority of audiovisual equipment and can also output higher voltage electrical power (e.g., about 28 volts), have been introduced, such as for cinematic cameras and lighting having higher power demands, the cinematic industry still relies on lower voltage/standard chargers (e.g., chargers outputting about 14 volts) to charge battery packs. The challenge in relying on conventional chargers is that the charge rate provided by such conventional battery chargers is limited.

The present inventive concept provides a battery pack charging apparatus, system, and method that utilize the dual voltage capability of modern battery packs to charge the battery packs at a faster rate. According to aspects of the present disclosure, a dual voltage battery back (see, e.g., batteries 104, 404, or 504) capable of providing electrical power output at about either 14 or 28 volts and switching between these two output voltages based on the type of audiovisual device being powered can also be switched to the relatively high voltage 28 volts mode for charging. That is, a battery pack capable of outputting a higher voltage, such as about 28 volts, can also receive the same relatively high voltage of 28 volts to increase the charging speed of the battery pack compared with a lower voltage charging rate at about 14 volts. In other words, the battery charger (see, e.g., battery charger 101) can take advantage of the dual voltage capability of a battery pack to charge the battery pack at a higher rate by utilizing the higher voltage capability of the dual voltage battery pack. A similar approach can also be applied by a battery charger designed to charge a multiple voltage battery pack having more than two output modes.

Provided in accordance with aspects of the present disclosure is a battery charging apparatus including a battery charger having a housing. At least one battery mount plate is arranged on the housing of the battery charger. The battery mount plate is configured to charge a battery by transmitting power from the battery charger to the battery. The battery mount plate includes a contact block. The contact block includes at least one electrical terminal. A ground terminal of the contact block provides a ground connection to the battery. The battery can operate in a first state in which the battery delivers a first delivery voltage or in a second state in which the battery delivers a second delivery voltage. The second delivery voltage is higher than the first delivery voltage. The battery can be charged in the first state or the second state. The battery charger is configured to switch the battery between the first state and the second state. The battery charger is configured to charge the battery in the second state by providing a charging voltage to the battery through the electrical terminal of the contact block. The charging voltage is substantially the same as the second delivery voltage of the battery.

In an aspect of the present disclosure, the contact block includes a first electrical terminal configured to provide a first charging voltage to the battery and a second electrical terminal configured to provide a second charging voltage to the battery. The second charging voltage is higher than the first charging voltage. A ground terminal of the contact block provides a ground connection to the battery. The battery can operate in a first state in which the battery delivers a first delivery voltage or in a second state in which the battery delivers a second delivery voltage. The second delivery voltage is higher than the first delivery voltage. The battery can be charged in the first state or the second state. The battery charger is configured to switch the battery between the first state in which power is provided to the battery through the first electrical terminal at the first charging voltage and the second state in which power is provided to the battery through the second electrical terminal at the second charging voltage to charge the battery in the second state.

In an aspect of the present disclosure, the battery is configured to have a parallel cellular arrangement in the first state, and the battery is configured to have a series cellular arrangement in the second state.

In an aspect of the present disclosure, the battery charging apparatus includes a resistor sense contact or a magnet switch. Each of the resistor sense contact and the magnet switch is configured to switch the battery between the first state and the second state.

In an aspect of the present disclosure, the battery can be switched from the first state to the second state by serial communication, such as i2c/SMBUS.

In an aspect of the present disclosure, the first charging voltage is about 14.4 volts, and the second charging voltage is about 28.8 volts.

In an aspect of the present disclosure, the first delivery voltage is 14.4 volts, and the second delivery voltage is about 28.8 volts.

In an aspect of the present disclosure, the battery is configured power an audiovisual device. The audiovisual device may be a light, a camera, or a monitor.

In an aspect of the present disclosure, the battery mount plate includes a V-mount, a B-mount or a 3-stud mount battery connection.

In an aspect of the present disclosure, the battery mount plate is configured to connect with the battery by an electromechanical connection.

Provided in accordance with aspects of the present disclosure is a battery charging system including a computer in communication with the battery charger. The computer includes a processor and a memory. The memory stores computer instructions configured to cause the processor to control the battery charger to switch the battery between the first state and the second state in which power is provided to the battery through the electrical terminal at the a charging voltage substantially equal to the second and higher delivery voltage of the battery.

In an aspect of the present disclosure, the computer is arranged in the housing of the battery charger.

Provided in accordance with aspects of the present disclosure is a method of charging an audiovisual device battery includes providing the battery charging apparatus including the battery charger having the battery mount plate. The battery is switched, by the battery charger, from a first state in which the battery delivers a first delivery voltage and a second state in which the battery delivers a second delivery voltage higher than the first delivery voltage. The battery is then charged in the second state, by the battery charger, by providing a charging voltage to the battery through the electrical terminal of the contact block. The charging voltage is substantially the same as the second delivery voltage of the battery.

Provided in accordance with aspects of the present disclosure is a method of charging an audiovisual device battery includes providing the battery charging apparatus including the battery charger having the battery mount plate. The battery is switched, by the battery charger, from a first state in which the battery delivers a first delivery voltage or receives the first charging voltage and a second state in which the battery delivers a second delivery voltage or receives the second charging voltage. The battery is then charged, by the battery charger, by providing the second charging voltage to the battery through the second electrical terminal of the contact block.

In an aspect of the present disclosure, the method includes switching the battery, by the battery charger, back to the first state in which the battery delivers the first voltage after the battery is charged in the second state at the higher second charging voltage.

BRIEF DESCRIPTION OF THE DRAWINGS

Various aspects and features of the present disclosure are described hereinbelow with reference to the drawings wherein.

DETAILED DESCRIPTION

Figure 1:
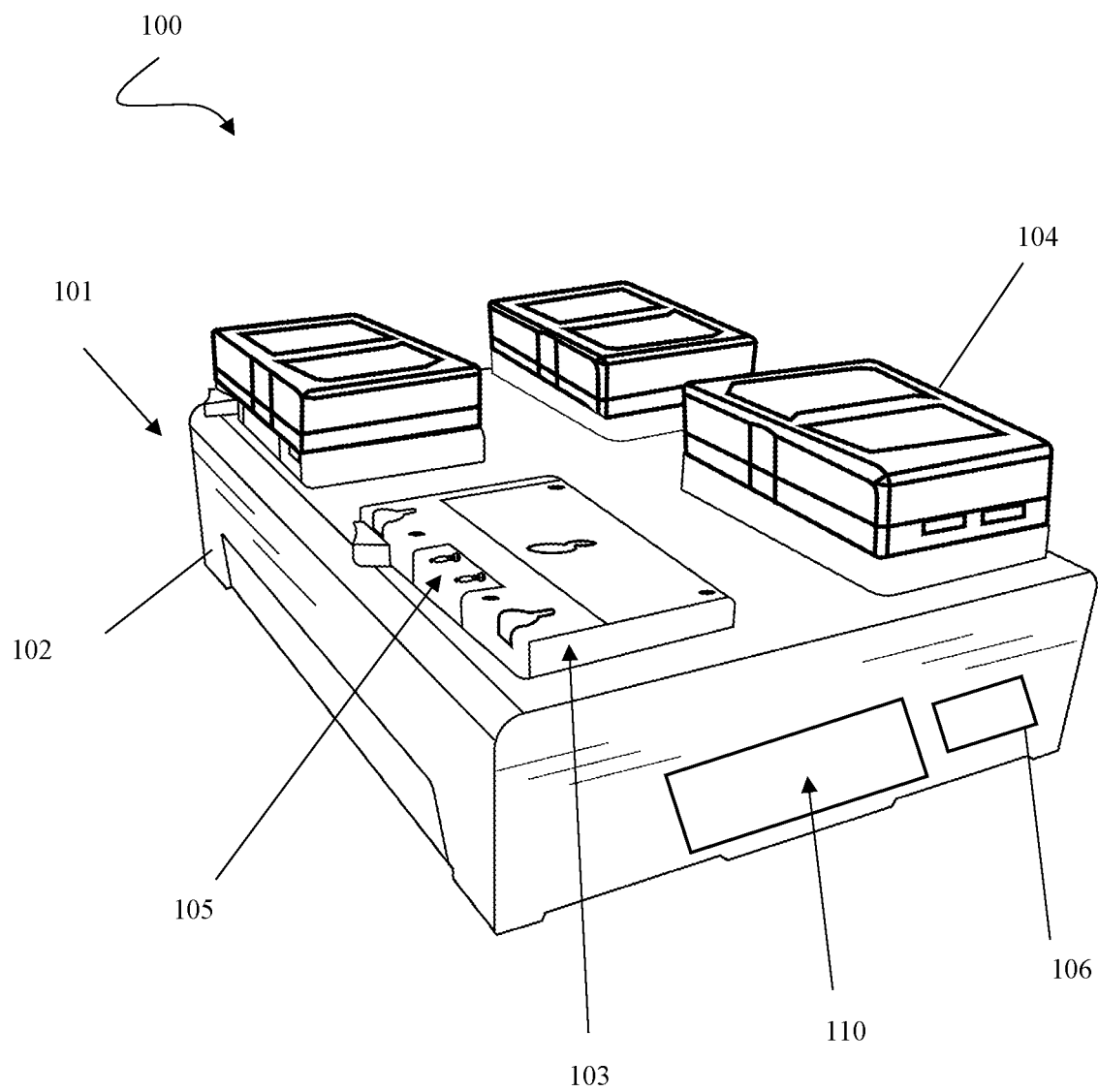
FIG. 1 is a perspective view of a battery charging system and apparatus according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "mount plate," and "battery mount plate" may be used interchangeably herein. The phrases "battery," "battery pack," and "pack" may be used interchangeably herein.

High voltage batteries can be employed as a platform for high power delivery since they require less current (and also less heat, and less resistance with cabling). However, with high voltage power output, operational runtime becomes an issue.

For example, camera operators may desire high-capacity battery packs, (e.g., battery packs exceeding 98 watt hours (wh) or exceeding 150 wh), and thus conventional battery packs might not be sufficient to support power hungry audiovisual equipment. Thus, there is an increasing demand for high voltage battery packs with capacities of 200 wh or more.

However, with higher capacity battery packs, charging times can become a limiting factor to the use of such battery packs. The standard for the majority of the audiovisual equipment is 14.4 volts mean operational voltage, and thus conventional battery chargers are generally designed to output about 14.4 volts for charging the corresponding 14.4 volts battery packs. One benefit of dual voltage battery packs is that they can charge at the 14.4 volts mean voltage on legacy chargers, along with powering a majority of conventional audiovisual devices, as well as powering higher voltage audiovisual devices, such as audiovisual devices requiring or capable of accepting a higher voltage (e.g., 25.9 volts or 28.8 volts) battery pack. A higher voltage battery pack or a dual voltage battery pack connected with a low voltage 14.4 volts charger will take a relatively long time to charge, particularly with a high voltage battery pack having a large capacity in excess of 200 wh.

There is a subset of single output, high voltage battery packs on the market that operate as strictly high voltage (e.g., 25.9 volts standard or 28.8 volts standard). These dedicated high voltage systems can be problematic, as they may require a separate high voltage charger. The battery charging device, system, and method described herein can be employed for charging any of a low voltage battery pack (e.g., about 14 volts), a dual voltage battery pack (e.g., about 14 volts or about 28 volts), a multiple voltage battery pack having more than 2 voltage modes, or a dedicated high voltage battery pack (e.g., about 25.9 volts or about 28 volts).

In the case of a high voltage battery pack, the battery charger (e.g., battery charger 101) described herein, would not actually need to "switch" the battery pack to the high voltage mode, but instead would merely output the higher output charging voltage to charge the high voltage battery pack.

Figure 4:
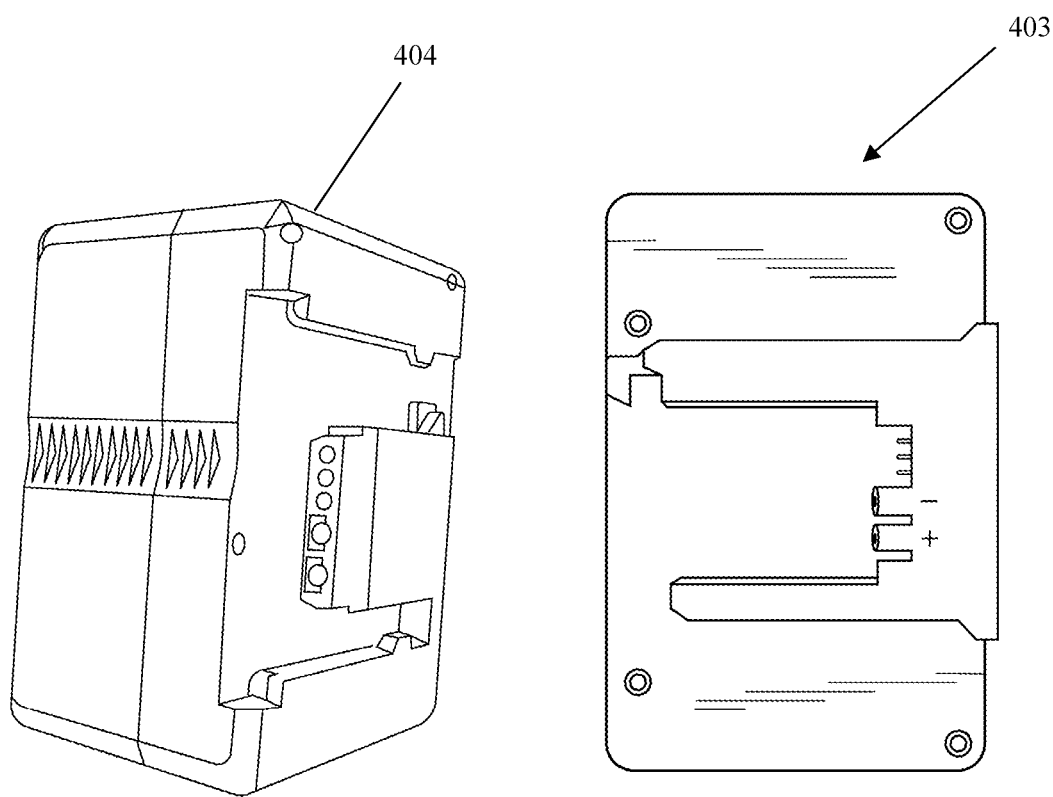
FIG. 4 illustrates a second exemplary battery mount plate and a second exemplary battery configured to connect with the second exemplary battery mount plate.
Figure 5:
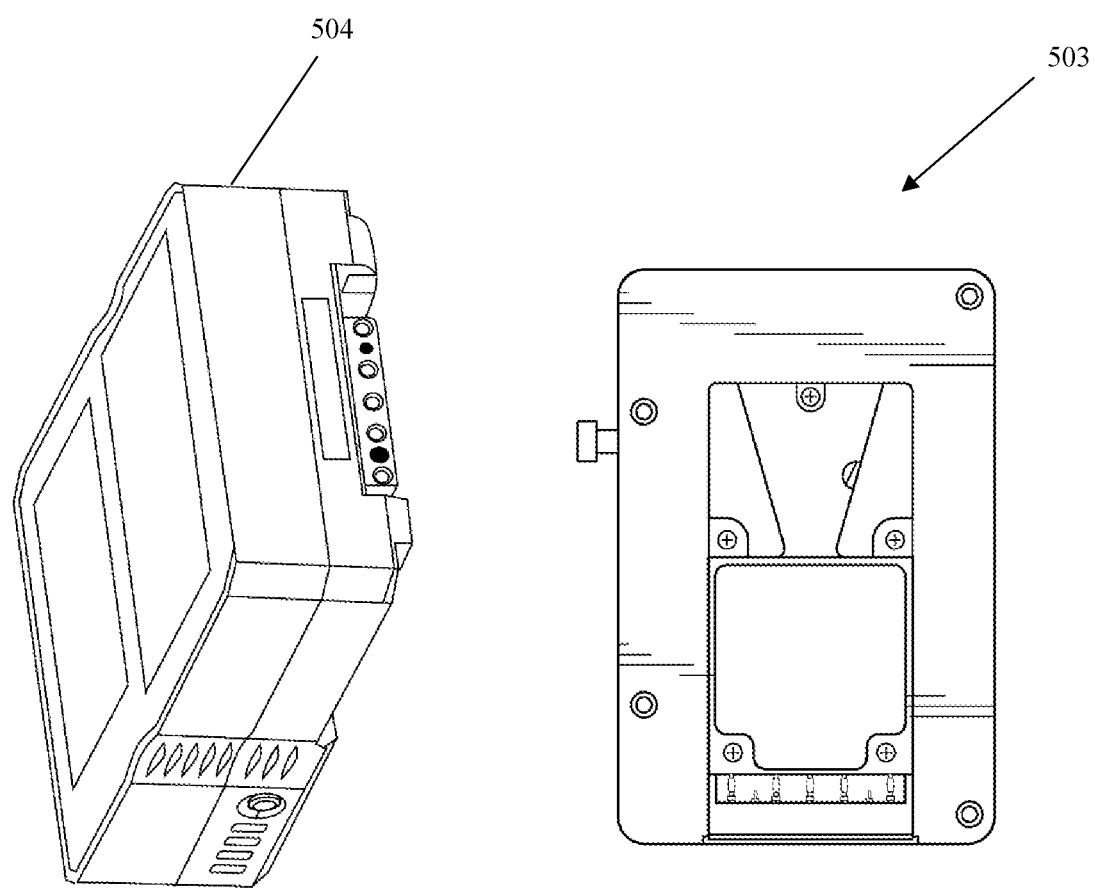
FIG. 5 illustrates a third exemplary battery mount plate and a third exemplary battery configured to connect with the third exemplary battery mount plate.

Exemplary embodiments of the present inventive concept provide a high voltage battery charging system 100 capable of switching a battery pack (see, e.g., battery pack 104 in FIG. 1, battery pack 404 in FIG. 4, or battery pack 504 in FIG. 5) from a low voltage parallel cellular arrangement to a series cellular arrangement to charge the battery pack at high voltage to allow for faster charging. The charging system 100 can include one or more battery mount plates (see, e.g., battery mount plates 103 in FIGS. 1 to 3, battery mount plate 403 in FIG. 4, or battery mount plate 503 in FIG. 5) to charge one ore many batteries. It should be noted that the number of battery mount plates may be modified, as desired, to accommodate any number of desired batteries. The battery mount plates may be in the form of various battery mount arrangements, such as V-mount (see, e.g., battery mount plate 503 in FIG. 5), G-mount (see, e.g., battery mount plate 103 in FIGS. 1 to 3), B-mount (see, e.g., battery mount plate 403 in FIG. 4), or other arrangements. Upon connecting the battery pack (e.g., a dual voltage battery pack) to the battery mount plate on the charging system 100, the battery pack can be substantially immediately switched to its higher voltage mode to accept the higher voltage provided by the charging system 100.

Once removed from the charger, the battery pack can revert back to a low voltage state (e.g., a parallel cellular arrangement) to allow for a more compatible mean voltage usage for lower voltage (e.g., about 14 volts) audiovisual equipment, as well as still being able to charge on lower voltage chargers.

Figure 2:
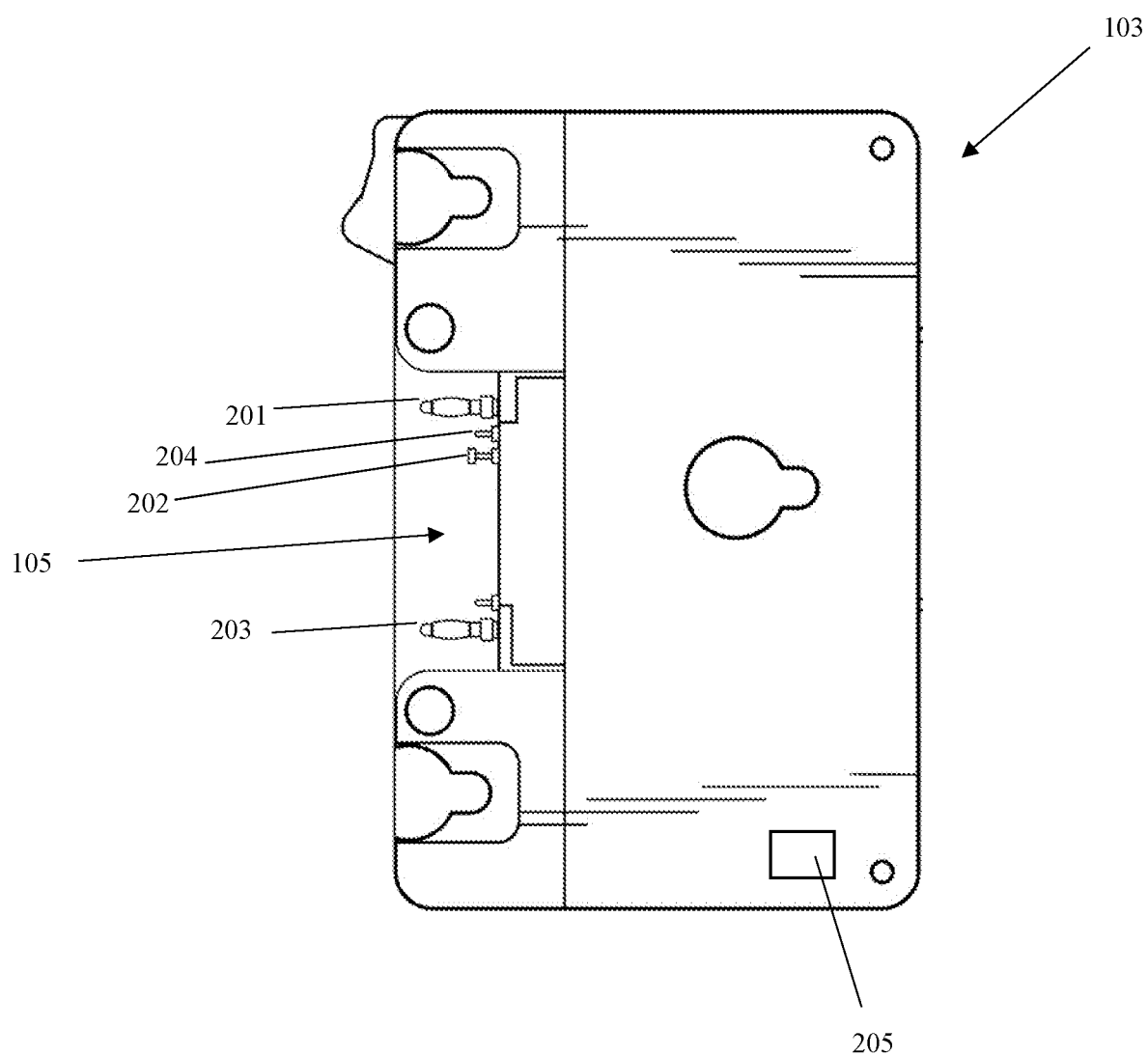
FIG. 2 is an enlarged view of a battery mount plate of the battery charging apparatus of FIG. 1.
Figure 3:
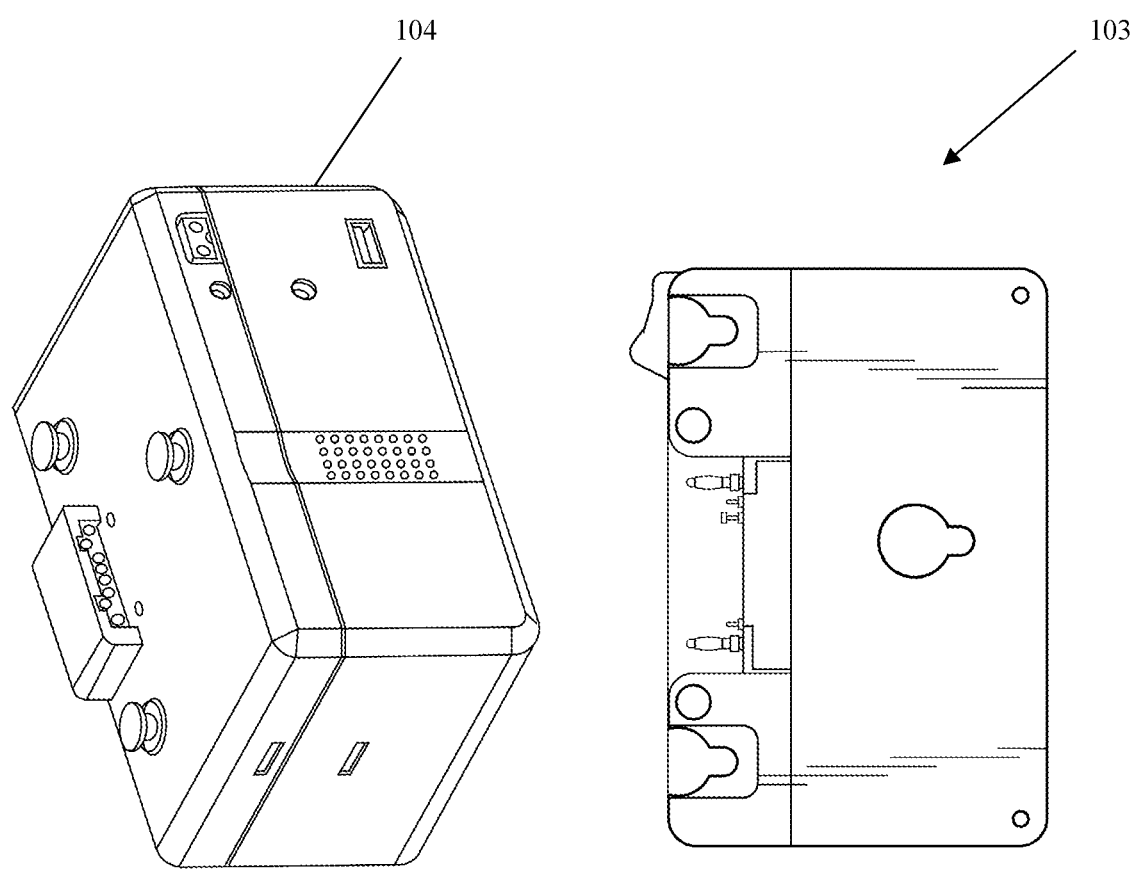
FIG. 3 illustrates an exemplary battery configured to connect with the battery mount plate of FIG. 1.

Referring particularly to FIGS. 1 to 3, a battery charging apparatus includes a battery charger 101 having a housing 102. At least one battery mount plate 103 is arranged on the housing 102 of the battery charger 101. The battery mount plate 103 is configured to charge a battery 104 by transmitting electrical power from the battery charger 101 to the battery 104. The battery charger 101 can include multiple battery mount plates 103 to charge numerous batteries 104. Each battery mount plate 103 can have a different mechanical connection (a V-mount, a B-mount or a 3-stud mount battery connection) to connect with a corresponding battery (see, FIG. 4 or 5 for alternative battery connection). Mount plates having different mounting arrangements for connecting with different types of batteries is described in U.S. Pat. No. 10,197,630, the entire contents of which are incorporated by reference herein. A mount plate having various features is described in U.S. Pat. No. 10,841,492, the entire contents of which are incorporated by reference herein.

Unless otherwise indicated herein, the battery mount plates (e.g., 103, 403, and 503) have substantially the same electrical arrangements as each other, other than changes in the structural arrangement of the battery mount plates to facilitate the electro-mechanical connection between the battery mount plate and the corresponding battery. That is, each battery mount plate is arranged to accept a dual voltage battery and to output electrical charging energy thereto, and to switch the corresponding dual voltage battery to its higher voltage state, regardless of the physical connection employed to mechanically connect the battery with the battery mount plate. The battery mount plates can also be configured to receive a single voltage battery, or a multiple voltage battery, as described herein.

Referring particularly to FIG. 2, the battery mount plate 103 includes a contact block 105. The contact block 105 includes a first electrical terminal 201 configured to provide a first charging voltage to the battery 104 and a second electrical terminal 202 configured to provide a second charging voltage to the battery 104. The second charging voltage (e.g., 28.8 volts) is higher than the first charging voltage (e.g., 14.4 volts). A ground terminal 203 of the contact block 105 provides a ground connection to the battery 104. The battery 104 can operate in a first state in which the battery 104 delivers a first delivery voltage (e.g., 14.4 volts) or in a second state in which the battery 104 delivers a second delivery voltage (e.g., 28.8 volts). Each of the electrical terminals described herein (e.g., terminals 201, 202, or 203)) may be a pin configured to connect with a corresponding orifice or other electrical connection of a corresponding battery. Other terminals, such as data terminals, pressure sensing terminals, or auxiliary terminals may also be included in the contact block 105. While at least two electrical terminals (201 and 202) may be employed, a single electrical terminal configured to output a relatively higher charging voltage may be employed. The relatively higher charging voltage is substantially the same as the relatively higher second delivery voltage of the battery 104. Thus, the battery charger 101 can operate solely as a high voltage charger (e.g., utilizing a single electrical terminal outputting about 28.8 volts to a battery), or the battery charger 101 can operate as a dual voltage charger that can output at least two different charging voltages (e.g., by utilizing a single electrical terminal or at least two separate electrical terminals providing different charging voltages to a battery, such as a dual voltage battery).

In use, the battery 104 can be charged in the first state or the second state. The battery charger 101 is configured to switch the battery 104 between the first state in which power is provided to the battery 104 through the first electrical terminal 201 at the first charging voltage and the second state in which power is provided to the battery 104 through the second electrical terminal 202 at the second charging voltage to charge the battery 104 in the second state. A single electrical terminal (e.g., 202) may be employed for a single output battery charger.

In an aspect of the present disclosure, the battery 104 is configured to have a parallel cellular arrangement in the first state, and the battery 104 is configured to have a series cellular arrangement in the second state.

Referring particularly to FIGS. 1 and 2, the battery charger 101 may include a switching circuit 106 configured to switch the battery 104 between the first state and the second state. As an example, the battery charger 101 may include a resistor sense contact 204 or a magnet switch 205. The switching circuit 106 may control activation of the resistor sense contact 204, or the magnet switch 205. Each of the resistor sense contact 204 and the magnet switch 205 is configured to switch the battery 104 between the first state and the second state. Either of the resistor sense contact 204, or the magnet switch 205, can be arranged in the housing 102 of the battery charger 101, or in the battery mount plate 103. An exemplary switching circuit is described in U.S. Pat. No. 10,630,095, the entire contents of which are incorporated by reference herein.

In an aspect of the present disclosure, the battery 104 can be switched from the first state to the second state by serial communication, such as i2c/SMBUS.

In an aspect of the present disclosure, the switching circuit 106 (see, e.g., FIG. 1) selectively activates the first battery power terminal 201 (see, e.g., FIG. 2) or the second battery power terminal 202 (see, e.g., FIG. 2). The switching circuit 106 may include or may be connected with the resistor sense contact 204, or the magnet switch 205. The switching circuit 106 may be arranged in the housing 102 of the battery charger 101 or the switching circuit 106 may be integrated into each battery mount plate 103.

In an aspect of the present disclosure, the first charging voltage is about 14.4 volts, and the second charging voltage is about 28.8 volts, and the first delivery voltage is about 14.4 volts, and the second delivery voltage is about 28.8 volts.

In an aspect of the present disclosure, the battery 104 is configured power an audiovisual device. The audiovisual device may be a light, a camera, or a monitor.

Referring particularly to FIG. 1, a battery charging system 100 includes a computer 110 in communication with the battery charger 101. The computer 110 is configured to control the operations of the battery charging system 100, as described herein. An exemplary computer structure employable by the computer 110 is described in more detail below with reference to FIG. 7. The computer 110 includes a processor and a memory (see, e.g., FIG. 7). The memory stores computer instructions configured to cause the processor to control the battery charger 101 to switch the battery 104 between the first state in which power is provided to the battery through the first electrical terminal 201 at the first charging voltage and the second state in which power is provided to the battery 104 through the second electrical terminal 202 at the second charging voltage.

In an aspect of the present disclosure, the computer 110 may be arranged in the housing 102 of the battery charger 101. Alternatively, the computer 110 may be arranged separately from the battery charger 101 and may be connected with the battery charger 101 by a wired or wireless connection (e.g., Bluetooth, WiFi, or cellular network connection).

Figure 6:
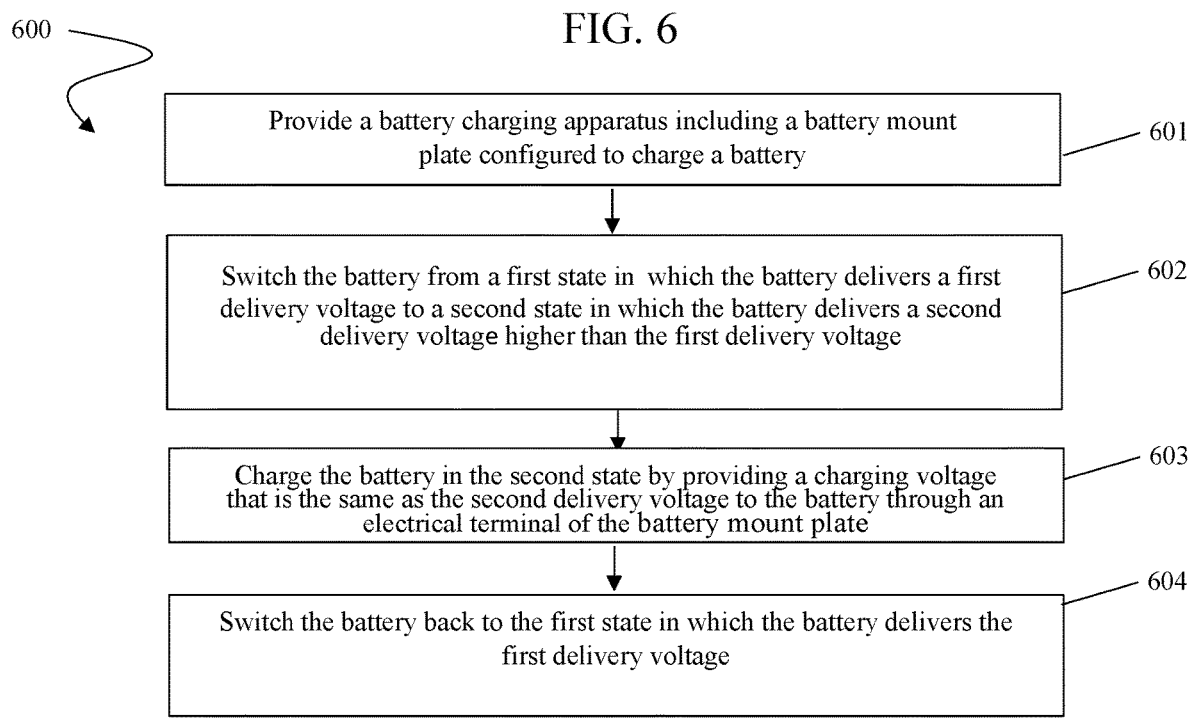
FIG. 6 is a flow chart of a method of charging a battery for audiovisual equipment according to aspects of the present disclosure.

Referring particularly to FIG. 6, a method 600 of charging an audiovisual device battery includes providing the battery charging apparatus including the battery charger having the battery mount plate (step 601). The battery is switched, by the battery charger, from a first state in which the battery delivers a first delivery voltage and a second state in which the battery delivers a second delivery voltage higher than the first delivery voltage (step 602). The battery is then charged in the second state, by the battery charger, by providing a charging voltage that is the same as the second delivery voltage to the battery through the electrical terminal of the contact block (step 603).

In an aspect of the present disclosure, the method 600 includes switching the battery, by the battery charger, back to the first state in which the battery delivers the first voltage after the battery is charged in the second state at the higher second charging voltage (step 604).

Referring again to FIG. 2, the battery mount plate 103 includes a low voltage pin (see, e.g., first power terminal 201) configured to conduct low voltage current to battery 104. The battery mount plate 103 also include a high voltage pin (see, e.g., second power terminal 201) configured to conduct high voltage current to the battery 104. As an example, the low voltage pin is configured to conduct a current from about 11 volts to about 17 volts (e.g., 14.4 volts) to the battery 104 and the high voltage pin is configured to conduct current from about 17.1 volts to about 34 volts (e.g., 28.8 volts) to the battery 104. The same ground terminal 203 may be employed when either of the high voltage pin or the low voltage pin is employed for conducting electricity between the battery mount plate 103 and the battery 104. The use of the low voltage pin and the high voltage pin allows for a connection to a dual voltage battery that is configured to output at least two different voltages.

Figure 7:
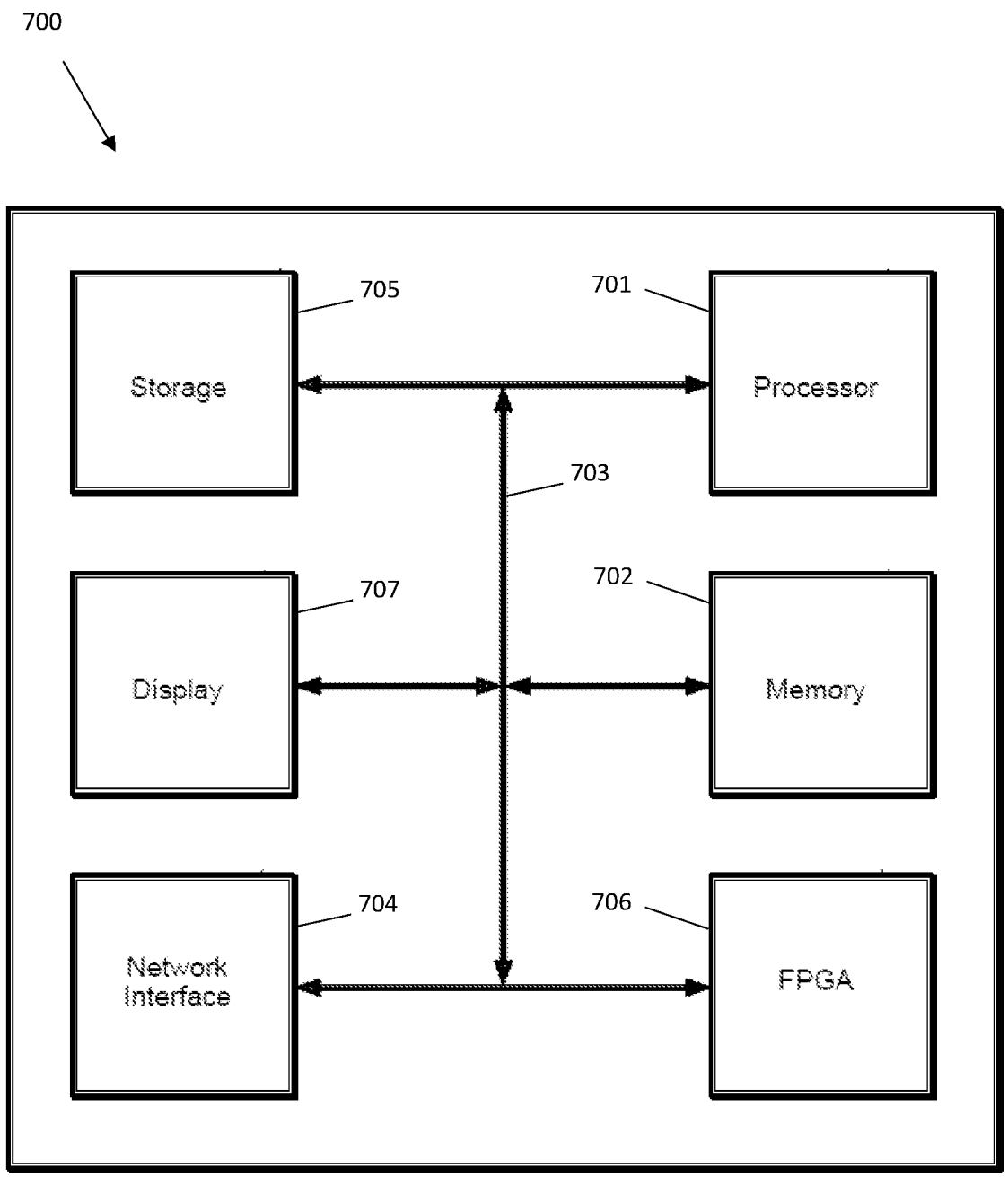
FIG. 7 is a block diagram of an exemplary computer employable by the device, system, and method described herein according to aspects of the present disclosure.

Referring to FIG. 7, a general-purpose computer 700 employable by the battery charger 101 is described. The general-purpose computer 700 can be employed by the battery charger 101 to perform the various functions described herein. The computer 700 may include a processor 701 connected to a computer-readable storage medium or a memory 702 which may be a volatile type memory, e.g., RAM, or a non-volatile type memory, e.g., flash media, disk media, etc. The processor 701 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 702 can be random access memory, read-only memory, magnetic disk memory, solid state memory, optical disc memory, and/or another type of memory. The memory 702 can communicate with the processor 701 through communication buses 703 of a circuit board and/or through communication cables such as serial ATA cables or other types of cables. The memory 702 includes computer-readable instructions that are executable by the processor 701 to operate the computer 700 to execute the various functions described herein. The computer 700 may include a network interface 704 to communicate (e.g., through a wired or wireless connection) with other computers or a server. A storage device 705 may be used for storing data. The computer 700 may include one or more FPGAs 706. The FPGAs 706 may be used for executing various functions described herein. A display 707 may be employed to display data processed by the computer 700.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A battery charging apparatus, comprising:
   a battery charger including a housing and a switching circuit arranged in the housing of the battery charger; and
   at least one battery mount plate arranged on the housing of the battery charger, wherein the at least one battery mount plate is configured to charge a battery by transmitting power from the battery charger to the battery, wherein the at least one battery mount plate includes a contact block, wherein the contact block includes:
   at least one electrical terminal configured to provide a charging voltage to the battery; and
   at least one ground terminal configured to provide a ground connection to the battery,
   wherein the battery is configured to operate in a first state in which the battery delivers a first delivery voltage or in a second state in which the battery delivers a second delivery voltage, wherein the second delivery voltage is higher than the first delivery voltage, wherein the battery is configured to be charged in the first state or the second state,
   wherein the battery charger is configured to switch the battery between the first state and the second state by using the switching circuit arranged in the housing of the battery charger, and
   wherein the battery charger is configured to charge the battery in the second state by providing the charging voltage to the battery through the at least one electrical terminal, wherein the charging voltage is substantially the same as the second delivery voltage of the battery.

2. The battery charging apparatus of claim 1, wherein the battery is configured to have a parallel cellular arrangement in the first state, and wherein the battery is configured to have a series cellular arrangement in the second state.

3. The battery charging apparatus of claim 1, further including a resistor sense contact or a magnet switch, wherein each of the resistor sense contact and the magnet switch is configured to switch the battery between the first state and the second state.

4. The battery charging apparatus of claim 1, wherein the at least one electrical terminal of the contact blocking includes a first electrical terminal configured to provide a first charging voltage to the battery; and a second electrical terminal configured to provide a second charging voltage to the battery, wherein the second charging voltage is higher than the first charging voltage.

5. The battery charging apparatus of claim 4, wherein the first charging voltage is about 14.4 volts, and wherein the second charging voltage is about 28.8 volts.

6. The battery charging apparatus of claim 1, wherein the battery is configured to power at least one audiovisual device.

7. The battery charging apparatus of claim 6, wherein the at least one audiovisual device is a light, a camera, or a monitor.

8. The battery charging apparatus of claim 1, wherein the at least one battery mount plate includes a V-mount, a B-mount or a 3-stud mount battery connection.

9. The battery charging apparatus of claim 1, wherein the at least one battery mount plate is configured to connect with the battery by an electro-mechanical connection.

10. The battery charging apparatus of claim 1, wherein the charging voltage is about 28.8 volts.

11. The battery charging apparatus of claim 1, wherein the battery charger is configured to charge the battery in the first state or the second state.

12. The battery charging apparatus of claim 1, wherein the at least one electrical terminal is a single electrical terminal, and wherein the battery charger is configured to charge the battery in the first state or the second state by transmitting power to the battery through the single electrical terminal.

13. A method of charging an audiovisual device battery, comprising:
   providing a battery charging apparatus including:
      a battery charger including a housing and a switching circuit arranged in the housing of the battery charger; and
      at least one battery mount plate arranged on the housing of the battery charger, wherein the at least one battery mount plate is configured to charge a battery by transmitting power from the battery charger to the battery, wherein the at least one battery mount plate includes a contact block, wherein the contact block includes:
         at least one electrical terminal configured to provide a charging voltage to the battery; and
         at least one ground terminal configured to provide a ground connection to the battery;
   switching the battery, by the switching circuit arranged in the housing of the battery charger, from a first state in which the battery delivers a first delivery voltage to a second state in which the battery delivers a second delivery voltage, wherein the second delivery voltage is higher than the first delivery voltage; and
   charging the battery in the second state, by the battery charger, by providing the charging voltage to the battery through the at last one electrical terminal of the contact block, wherein the charging voltage is substantially the same as the second delivery voltage of the battery.

14. The method of claim 13, further including switching the battery from the first state to the second state by activating a resistor sense contact, activating a magnet switch, or by serial communication.

15. The method of claim 13, further including switching the battery, by the battery charger, back to the first state in which the battery delivers the first delivery voltage.

16. The method of claim 13, wherein the battery is switched between a parallel cellular arrangement in the first state and a series cellular arrangement in the second state.

17. The method of claim 13, wherein the at least one electrical terminal of the contact blocking includes a first electrical terminal configured to provide a first charging voltage to the battery; and a second electrical terminal configured to provide a second charging voltage to the battery, wherein the second charging voltage is higher than the first charging voltage, and wherein the batter is switched between first charging voltage and the second charging voltage higher than the first charging voltage.

18. The method of claim 17, wherein the first charging voltage is about 14.4 volts, wherein the second charging voltage is about 28.8 volts, and wherein the battery is switched from the first charging voltage of about 14.4 volts to the second charging voltage of about 28.8 volts.

19. The method of claim 13, wherein the battery is used to power at least one audiovisual device.

20. The method of claim 13, wherein the battery is used to power a light, a camera, or a monitor.

\* \* \* \* \*